Feb. 17, 1959 L. C. DERMOND 2,873,958
THERMOSTATICALLY CONTROLLED AIR BLEED
Filed April 8, 1957 2 Sheets-Sheet 2

INVENTOR
Lawrence C. Dermond
BY
R. F. Barnard
ATTORNEY

United States Patent Office 2,873,958
Patented Feb. 17, 1959

2,873,958

THERMOSTATICALLY CONTROLLED AIR BLEED

Lawrence C. Dermond, Rochester, N. Y., assignor to General Motors Corporation, Detroit, Mich., a corporation of Delaware Application April 8, 1957, Serial No. 651,399

2 Claims. (Cl. 261—39)

The present invention relates to a fuel injection system of the type in which the quantity of fuel supplied to the engine is determined by the mass of air being supplied to the engine and further in which the quantity of fuel so supplied is modified by temperature responsive means to compensate for changes in air density.

The present invention is an improvement over the fuel control system of copending application Serial No. 608,797 Olson filed September 10, 1956. In the type fuel control system to which the Olson application relates under normal air flow conditions the quantity of air flowing through the induction system is adequate to provide a fuel metering vacuum control force. However, under low air flow conditions it has been found that the fuel metering signal, when dependent on the mass of air flow, is inadequate to provide suitable control of the fuel metering system. Accordingly, in the Olson device means is provided whereby a supplemental metering control force is created by the idle air flow and in this way control of the metering system is maintained. At least insofar as that portion of the metering control signal furnished by the idle air flow, and hence under the control of manifold vacuum, is concerned the density of the air being inducted is variable in accordance with ambient temperatures. Therefore, to maintain a constant air-fuel ratio by weight the manifold vacuum created control force must be temperature compensated.

In the present invention the compensation of the metering control force is achieved by providing a temperature responsive valve mechanism which is adapted to bleed atmospheric air into the metering control system in accordance with changes in engine temperature.

Inasmuch as it is the change in air density that occasions the need for modification of the metering control signal, it is the purpose of the present invention to position the temperature controlled valve mechanism as near the air intake as possible. In this way the actual air temperature rather than engine temperature, per se, will determine the measure of modulation of the metering control force and so more accurately stabilize the fuel-air ratio.

The details of the present invention along with other objects and advantages thereof will be apparent from a perusal of the description which follows.

Figure 1:
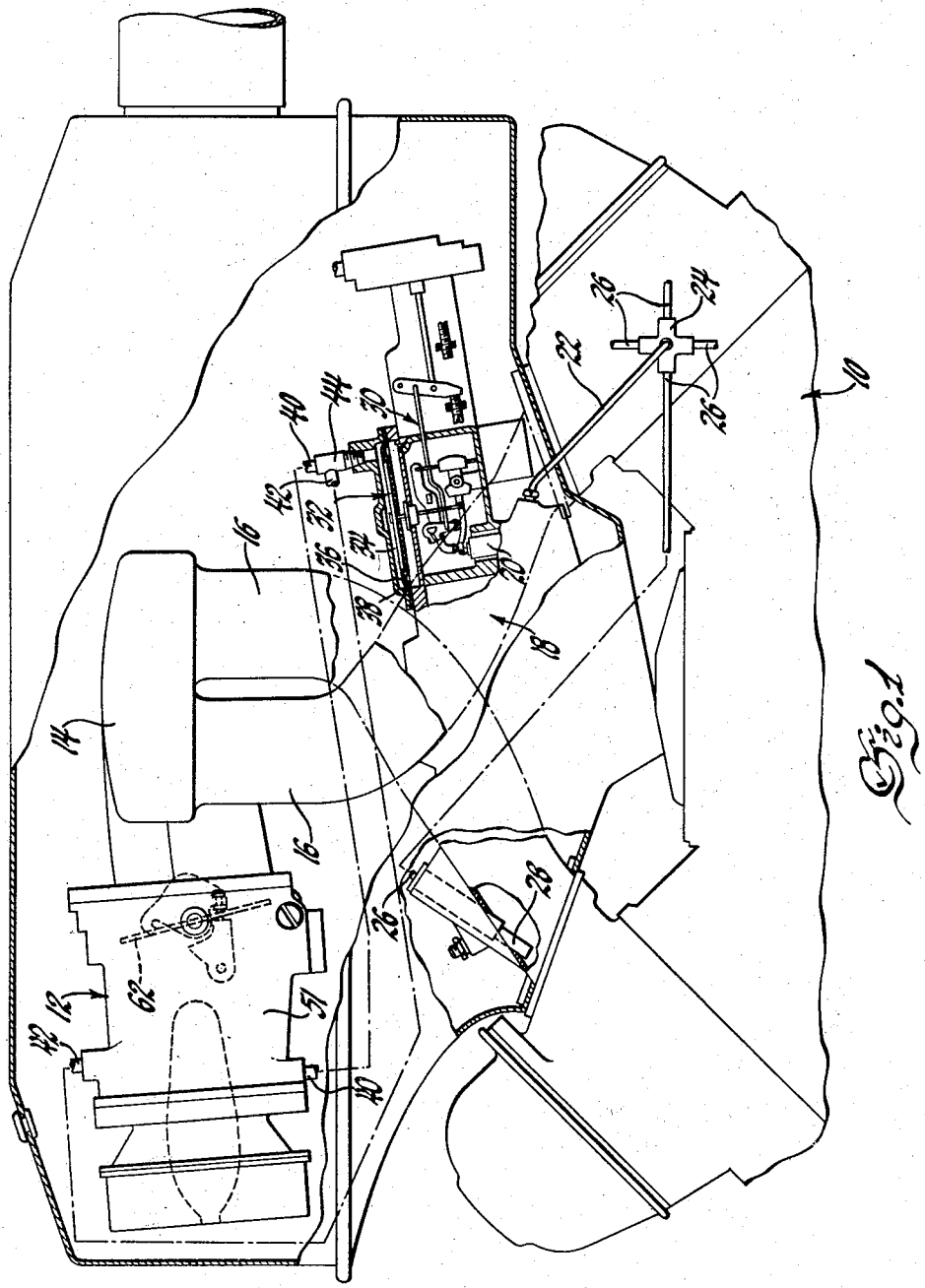
Figure 1 is a partially sectioned elevational view of a fuel injection system embodying the subject invention.

The present fuel injection system except as hereinafter specifically pointed out may be considered to be the same as that shown and described in the aforenoted copending Olson application which is used for illustrative purposes.

In general, the fuel injection sysem is mounted on an internal combustion engine 10 and includes an air intake portion 12 which is adapted to deliver air to a manifold or plenum chamber 14 and in turn to individual intake passages 16 for the cylinders of the engine. A source of fuel under pressure is shown generally at 18 and is adapted to deliver fuel to a metering valve 20 which supplies a conduit 22. Conduit 22 feeds a fuel manifold 24 which distributes the fuel to a plurality of individual fuel passages 26, each of which terminates in a nozzle 28 disposed in each intake passage. Thus fuel mixes with the incoming air just prior to entrance into the associated engine cylinder.

Figure 2:
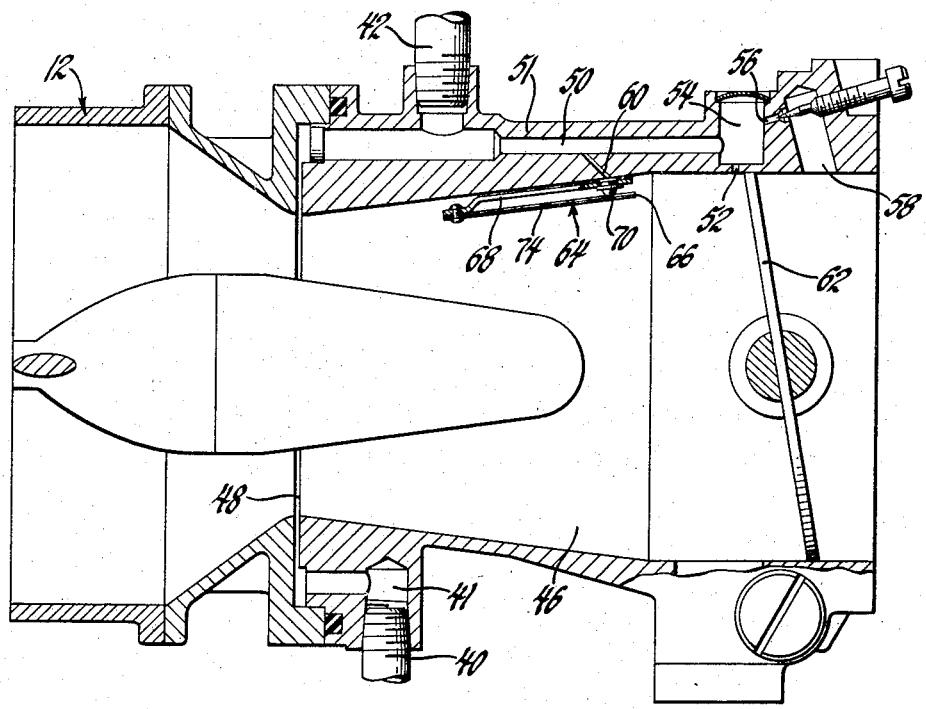
Figure 2 is an enlarged section of the induction passage embodying the present invention.
Figure 3:
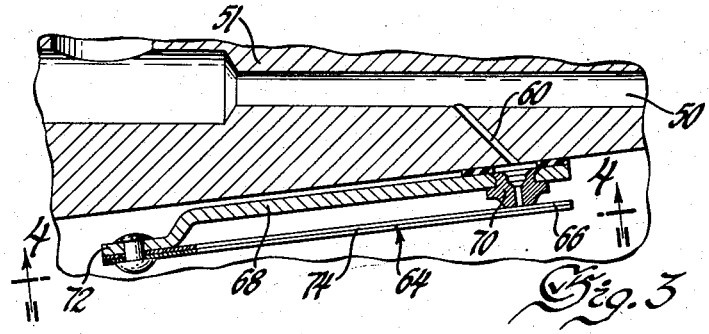
Figures 3 and 4 are enlarged views of the thermostatic bleed mechanism.
Figure 4:
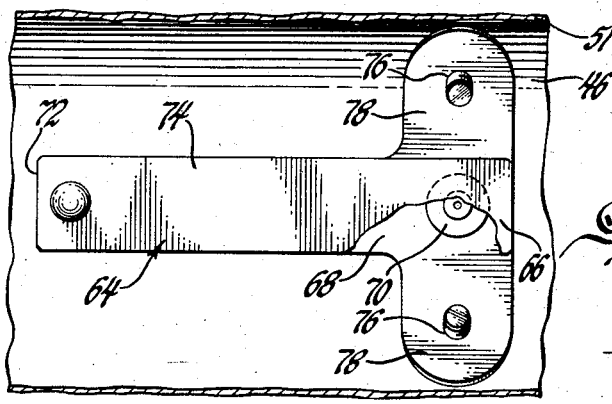

The metering valve 20 is controlled by a linkage mechanism 30 which is actuated by a diaphragm device 32. The diaphragm mechanism includes a chamber 34 defined by diaphragm 36 and a cover member 38. As described in the Olson application, a pair of conduits 40 and 42 communicate through a T plug member 44 with the diaphragm chamber 34. As seen in Figure 2, conduit 40 communicates at its other end with an annular chamber 41 opening into the induction passage 46 adjacent the venturi portion 48 of said passage. Thus, a vacuum control force is created in conduit 40 which is proportional to the mass of air flowing through the induction passage.

Conduit 42 communicates at its other end with a passage 50 formed in the induction passage casing 51. Passage 50 connects with the idle air flow network 52, 54, 56 and 58. Conditions of low air flow through the induction passage 46 are normally inadequate to provide a sufficient vacuum control force in conduit 40, however, a vacuum force will be created in passage 50 by idle air flow and such force is transmitted through conduit 42 to the diaphragm control chamber 34 to maintain an adequate quantity of fuel flow to the engine cylinder.

The structures and functions just described are the same as described in the copending Olson application.

Inasmuch as resort is had, under low air flow conditions, to mainfold vacuum it is now recognized that at least this portion of the fuel metering control force must be varied to compensate for variations in the density of the idle air flow which is affected by changes in temperature. As the intake air temperatures increase the air density decreases at a faster rate than any decrease in fuel density with the result that the basic air-fuel ratio is upset. To compensate for this condition, a bleed port 60 is formed in the induction passage casing 51 intermediate venturi 48 and throttle 62 and is adapted to communicate atmospheric air within the induction passage 46 to vacuum passage 50. A thermostatically controlled valve device 64 is mounted on the inner wall of the induction passage casing 51 and includes a temperature responsive movable valve element 66 for controlling the bleed of atmospheric air into the passage 50. The thermostatic valve mechanism is arranged so that as the temperature of the air entering the induction passage increases the valve member 66 will uncover port 60 to bleed atmospheric air into the vacuum passage 50 and thereby reduce the metering control force in diaphragm chamber 34 reducing the quantity of fuel supplied corresponding to the supply of less dense air to the engine. In this way a substantially constant fuel-air ratio by weight is maintained and insures greater fuel economy and smoother engine operation since an otherwise over-rich mixture would be supplied.

The thermostatic valve mechanism 64 comprises a T-shaped base plate member 68 curved to fit the internal curvature of the induction passage. The plate 68 is mounted on the induction passage such that an orifice plug 70 disposed in the plate therein registers with the port 60. The end 72 of plate 68 remote from plug 70 is upstruck and supports a bimetallic strip 74 therefrom. The element 74 is riveted or otherwise fixed to the upstruck portion 72 and the other end 66 of the element coacts with the orifice plug 70 to block the latter when the air temperatures are below a given value and to uncover the orifice when air temperatures exceed a given value to bleed atmospheric air into the passage 50 as described.

The plate 68 of valve mechanism 64 is secured to the induction casing 51 by suitable fastening means which coact with the holes 76 formed in transversely extending plate portions 78.

The size of the orifice in plug 70 is determined by the operating characteristics of the engine which will dictate the extent to which the fuel supply must be reduced to achieve satisfactory operation and economy. Since the plug 70 is separate from bimetallic strip 74 and staked, or otherwise fastened thereto, the plug may be changed to present a different size orifice to vary the rate at which air is bled to vacuum passage 50.

It is apparent that other structural variations of the subject invention are possible within the scope of the teachings hereinabove set forth.

I claim:

1. A fuel control system comprising a casing having an air induction passage, a venturi in said passage, means associated with and adapted to create a vacuum force proportional to the flow of air through said venturi, valve means for controlling the flow of air through said passage, passage means for bypassing air around said valve when the valve is closed for idling operation, a conduit formed in said casing and communicating with the bypass passage means whereby a vacuum force is created in the conduit proportional to the bypass air flow, a nozzle posteriorly of said valve for delivering fuel to the induction passage, a device for supplying fuel to said nozzle, said device including a fuel metering valve, diaphragm means connected to said valve and adapted to control the fuel flow therethrough, first conduit means for communicating the vacuum force in the bypass passage means with said diaphragm means, second conduit means communicating said venturi vacuum with said diaphragm means, a port formed in said casing and adapted to communicate the conduit with the induction passage anteriorly of said valve means, and temperature responsive valve means disposed in the induction passage proximate said port, said latter valve means being adapted to control the flow of air through the port in accordance with the temperature of the air flowing through the induction passage.

2. A fuel control system as set forth in claim 1 in which said temperature responsive valve means comprises a base plate member fixed to the induction passage wall, said plate including orifice means disposed therein and in registry with the port, and a thermostatically actuated element mounted on the plate to control the flow through the orifice means in accordance with the temperature of induction passage air.

References Cited in the file of this patent

UNITED STATES PATENTS

| | | |
|---|---|---|
| 2,396,031 | Udale et al. | Mar. 5, 1946 |
| 2,580,294 | Griffon | Dec. 25, 1951 |